United States Patent Office 3,507,923
Patented Apr. 21, 1970

3,507,923
METHOD OF CAPPING ALLYL ENDBLOCKED OXYALKYLENE POLYMERS
Robert E. Gessner, Saint Marys, and Donald L. Bailey, Sisterville, W. Va., assignors to Union Carbide Corporation, a corporation of New York
No Drawing. Filed Jan. 6, 1967, Ser. No. 607,625
Int. Cl. C07c 43/14
U.S. Cl. 260—615
4 Claims

ABSTRACT OF THE DISCLOSURE

In the manufacture of nonhydrolyzable siloxane-oxyalkylene copolymer surfactants, allyl alcohol started oxyalkylene polymers are capped with methyl groups without increasing the propenyl content by reacting the polymer with sodium or potassium methylate ($NaOCH_3$ or $KOCH_3$) in a thin film at 110° to 170° C. and pressure under 100 milliliters of mercury absolute while continuously distilling the methanol by-product from the reaction mixture, then reacting with methyl chloride, thereafter reacting with the silanic hydrogen of a hydrosiloxane copolymer.

DESCRIPTION

In the manufacture of polyurethane foams it is customary to include in the foam system as a surface active agent a siloxane-organic copolymer having a hydrophilic organic portion. As the copolymer, in which the siloxane is the hydrophobic portion, is usually added to the foam reaction mixture as a solution in water or in a water-amine mixture, it is preferably non-hydrolyzable and the solution should have a low viscosity so that it will readily and rapidly mix with the other ingredients of the foam reaction mixture.

The polyurethane foam industry is characterized by keen competition. Pound for pound, the siloxane-organic copolymer surfactants are by far the most expensive ingredients in a foam system. Accordingly, only the most efficient surfactants, in terms of the cost of the amount which must be used in the foam system, will be purchased. Small differences in efficiency may make the difference between acceptance and rejection.

A very useful and efficient siloxane-organic copolymer surfactant for this purpose comprises as the hydrophilic portion an oxyalkylene polymer derived from aliphatic diethers of polyoxyalkylene diols characterized by polyoxyalkylene chains containing both oxyethylene and oxy-1,2-propylene groups therein and having, for example, an average of 20 to 75 oxyethylene units and 20 to 55 oxypropylene units in each chain. A suitable siloxane-organic copolymer may be synthesized by terminating the oxyalkylene polymer with an allyl group and reacting with such allyl group a hydrosiloxane (i.e. a siloxane containing SiH) in the presence of a platinum catalyst, using the reaction conditions described in U.S. Patent 2,970,150, Donald L. Bailey.

This synthesis involves some practical problems. If the oxyalkylene ether polymer contains hydroxyl groups, they will react with silanic hydrogen to produce SiOC, a hydrolyzable linkage; if it contains diallyl, the siloxane copolymer will cross-link, increasing its viscosity and, in the extreme, forming a gel; if it contains propenyl groups ($CH_3$—CH=CH—), such groups not only are less reactive than allyl groups ($CH_2$=CH—$CH_2$—) to silanic hydrogen but also can hydrolyze in acidified water.

Commercially available oxyalkylene polymers are usually prepared by starting with such alcohols as methanol or butanol and reacting alkylene oxides therewith, thereby producing a polymer averaging about 5% to 20% dihydroxy material. Although these polymers can be capped with allyl groups by using allyl chloride in the Williamson synthesis, a considerable amount of diallyl material results which is derived from the dihydroxy material. Thus, the oxyalkylene polymer should be started with allyl alcohol, so that each chain will have but one allyl end-blocking group.

The allyl alcohol started oxyalkylene polymer will include monohydroxy and dihydroxy material. To eliminate the hydroxyl groups the polymers can be reacted with sodium or potassium methylate in accordance with the equation:

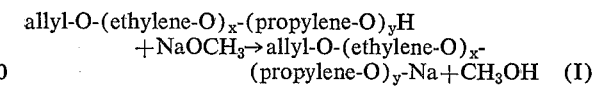

and the alkali metal salt so produced can be reacted with methyl chloride in accordance with the equation:

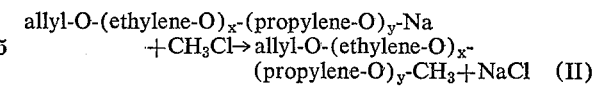

wherein $x$ and $y$ are integers.

The reaction (I) between alkali metal methylate and the allyl-started oxyalkylene polymer, when conducted in a batch-wise manner, is slow. Typically, a batch consisting of 413 pounds of a polymer having the formula

and 62 pounds of a 25 weight percent solution of sodium methylate in methanol was heated in a kettle at 110° C. and a kettle pressure of 150 millimeters of mercury, while sparging with dry nitrogen at a rate of 60 standard cubic feet per hour to hasten the removal of methanol. After five hours, the hydroxyl content was lowered from an original value of 0.87 to a final value of 0.11%. Sixteen pounds of sodium methylate in methanol was added and the reaction continued at the same temperature and pressure for another three hours, the kettle was then cooled to 75° C. and 41.5 pounds of methyl chloride added over three hours by pressure sparging at 20 p.s.i.g.; the product analyzed 0.01 weight percent hydroxyl.

As may be seen, this procedure reduces the hydroxyl content to a low level, but such long heating has the undesirable effect of isomerizing some of the allyl groups to propenyl groups. In the instance described, the propenyl content of the original polymer was only 0.16 weight percent, whereas after the six hours at 110° C. the propenyl content rose to 0.31%, and after the additional three hours it was 0.34%. Since the original allyl content was 1.39% by weight, it is evident that the allyl/propenyl ratio was decreased from about 8.7 to about 6.7, a change of about 23%.

This invention is based on the discovery that the reaction (I) between alkali metal methylate and the allyl started oxyalkylene polymer goes rapidly when it is conducted at an elevated temperature in a thin film under vacuum (i.e., at a pressure less than atmospheric) while continuously distilling the methanol by-product from the reaction mixture (typically, the reaction can be completed in two minutes) and that, in the short time required for this reaction, there is no significant isomerization of allyl groups to propenyl groups. The film thickness is preferably from 0.001 to 0.1 inch.

A convenient, available type of apparatus for conducting the reaction is a wiped film evaporator consisting of a degasser (flash-evaporator) and a distillation unit capable of operating at 110° C. to 170° C. and pressures of under 100 millimeters of mercury absolute. Such evaporators are extensively used to distill high molecular weight temperature-sensitive materials, such as orange juice, vegetable oils, vitamins, sterols, hormones, and dye-stuff intermediates.

In a typical example, 600 grams of an allyl alcohol started oxyalkylene polymer having the formula $$CH_2=CHCH_2(OC_2H_4)_{34}(OC_3H_6)_{37}OH$$

analyzing by weight 1.08% allyl, 0.03% propenyl, 0.60% hydroxyl, and 66 grams of a 25 weight percent solution of sodium methylate (100% excess) in methanol was thoroughly mixed and fed to a laboratory model of a wiped film evaporator consisting of a degasser and a distillation unit (a "Rota Film Still"). The wall temperature was 112° to 113° C. and the pressure 750 to 1000 microns absolute. The fed material passed through the evaporator in 55 minutes, with a dwell time of about two minutes. No methanol was detected in the product. The product was then reacted with methyl chloride (Reaction II) in a stirred glass flask at 75 to 80° C. for one hour at a pressure sealed to release at 5 p.s.i.g. or more. To the resulting material, toluene and water acidified with HCl were added and after thorough mixing were allowed to separate, then the salt water mixture was decanted and the toluene and water distilled off. The final (filtered) product analyzed by weight 1.17% allyl, no detectable propenyl, 0.07% hydroxyl, color less than 1 GVS, and viscosity of 388 centistokes.

On a larger scale, 3260 pounds of an allyl alcohol started oxyalkylene polymer having the formula $$CH_2=CHCH_2(OC_2H_4)_{23}-(OC_3H_6)_{32}OH$$

analyzing by weight 1.34% allyl, 0.06% propenyl, and 0.69% hydroxyl was mixed well with 409 pounds of a 25% by weight solution of sodium methylate and introduced into a commercial size wiped film evaporator consisting of a degasser and a main still section of 4 square feet evaporating surface at an average rate of about 165 pounds per hour. The degasser section was operated at 135° to 140° C. and 50 to 99 mm. mercury absolute pressure, the main still section at 140° to 150° C. and less than 1 mm. mercury absolute pressure. The thickness of the film of the reaction mixture was about 0.01 inch. The resulting distillant, having a sodium content of about 1.5 weight percent and a viscosity in the range of 3000 to 5000 centistokes, was then mixed with methyl chloride in an intensive mixer operated at 110° to 140° C. and about 50 p.s.i.g. which reduced the sodium to 0.1% or less. To 100 parts by weight of this material was added 86 parts by weight of toluene and 21 parts by weight of water, the mixture was agitated vigorously at 80° C. for 15 minutes and allowed to settle. The top phase was isolated and stripped of solvent. Analysis of the stripped material showed by weight 1.32% allyl, 0.08% propenyl, 0.02% hydroxyl, color 25 Pt–Co, viscosity 345 centistokes. The methyl-capped allyl alcohol started copolymer so produced was then reacted with a hydrosiloxane copolymer endblocked with trimethylsiloxy groups $$[Me_3SiO(Me_2SiO)_x(MeSiHO)_ySiMe_3$$

wherein $x$ and $y$ are integers] using platinum as catalyst, to produce the desired high quality, high efficiency surfactant for use in producing polyurethane foams.

As used herein, "capping" denotes converting a terminal hydroxyl group to a terminal ether group.

This invention is equally applicable to the capping of methallyl alcohol started oxyalkylene polymers. When such polymers are employed, the undesirable formation of isobutenyl groups ($CH_3$—$C(CH_3)$=$CH$—) from the methallyl groups ($CH_2$=$C(CH_3)$—$CH_2$—) is minimized.

What is claimed is:
1. Method of replacing substantially all of the hydroxyl groups of an allyl alcohol or methallyl alcohol started oxyalkylene polymer with alkali metal oxy groups without significantly increasing the propenyl or isobutenyl content thereof, said polymer having recurring oxyalkylene units endblocked at one end with an allyl or methallyl group and at the other end with a hydroxyl group, which method comprises reacting said hydroxyl groups with alkali metal methylate in a thin film at an elevated temperature and a pressure less than atmospheric while continuously distilling the methanol by-product from the reaction mixture, yielding alkali metal salt of said polymer.

2. Method as claimed in claim 1, wherein said alkali metal is sodium, wherein said oxyalkylene polymer contains both oxyethylene and oxypropylene units and has an average of 20 to 75 oxyethylene units and 20 to 55 oxypropylene units in each chain and wherein the starter is allyl alcohol.

3. Method as claimed in claim 1 wherein said reaction is conducted at a temperature from 110° C. to 170° C. and at a pressure under 100 millimeters of mercury absolute.

4. Method of replacing substantially all of the hydroxyl groups of an allyl alcohol started oxyalkylene polymer with alkali metal oxy groups without significantly increasing the propenyl content thereof, said polymer having recurring oxyalkylene units endblocked at one end with an allyl group and at the other end with a hydroxyl group, which method comprises reacting said hydroxyl groups with alkali metal methylate in a film having a thickness from 0.001 to 0.1 inch at a temperature from 110° C. to 170° C. and at a pressure under 100 millimeters of mercury absolute while continuously distilling the methanol by-product from the reaction mixture, yielding an alkali metal salt of said polymer.

References Cited

UNITED STATES PATENTS

| | | | |
|---|---|---|---|
| 1,881,041 | 10/1932 | Benjamin | 203—89 |
| 2,403,978 | 2/1946 | Hickman et al. | 202—205 |
| 2,615,853 | 10/1952 | Kirkpatrick et al. | |
| 2,662,859 | 12/1953 | Kirkpatrick. | |
| 2,782,240 | 2/1957 | Hefner et al. | |
| 2,813,129 | 11/1957 | Benoit. | |
| 3,054,444 | 9/1962 | Robbins | 203—89 XR |
| 3,060,107 | 10/1962 | Smith | 203—89 XR |
| 3,199,575 | 8/1965 | Keller | 203—89 XR |
| 3,402,192 | 9/1968 | Haluska. | |

FOREIGN PATENTS

| | | |
|---|---|---|
| 955,916 | 4/1964 | Great Britain. |

BERNARD HELFIN, Primary Examiner

H. T. MARS, Assistant Examiner

U.S. Cl. X.R.
260—448.2